United States Patent
Varale

(10) Patent No.: US 10,411,452 B2
(45) Date of Patent: Sep. 10, 2019

(54) DEVICE FOR THE FASTENING OF CABLES, TUBULAR BODIES AND OTHER ELONGATED BODIES IN GENERAL HAVING A DIFFERENTIATED DIAMETER

(71) Applicant: FI.MO.TEC. S.P.A., Milan (IT)

(72) Inventor: Alberto Varale, Milan (IT)

(*) Notice: Subject to any disclaimer, the term of this patent is extended or adjusted under 35 U.S.C. 154(b) by 0 days.

(21) Appl. No.: 15/550,050

(22) PCT Filed: Oct. 3, 2016

(86) PCT No.: PCT/EP2016/073575
§ 371 (c)(1),
(2) Date: Aug. 10, 2017

(87) PCT Pub. No.: WO2017/060199
PCT Pub. Date: Apr. 13, 2017

(65) Prior Publication Data
US 2018/0205213 A1   Jul. 19, 2018

(30) Foreign Application Priority Data

Oct. 7, 2015 (IT) .......................... 102015000059082

(51) Int. Cl.
*H02G 3/30* (2006.01)
*H02G 3/32* (2006.01)
*F16L 3/237* (2006.01)

(52) U.S. Cl.
CPC ............... *H02G 3/32* (2013.01); *F16L 3/237* (2013.01); *H02G 3/30* (2013.01)

(58) Field of Classification Search
CPC .. H02G 3/30; H02G 3/32; H02G 3/22; H02G 3/26; H02G 3/28; H02G 3/288; H02G 3/40; F16L 3/257; F16L 5/00; F16L 7/00

USPC ................... 248/74.1, 67.5, 68.1, 72, 73, 65
See application file for complete search history.

(56) References Cited

U.S. PATENT DOCUMENTS

| | | | |
|---|---|---|---|
| 5,046,766 A | 9/1991 | Lomberty et al. | |
| 5,752,681 A * | 5/1998 | Janssen | F16L 3/04 248/65 |
| 7,007,900 B2 * | 3/2006 | Goodwin | H02G 7/053 248/68.1 |
| 7,175,138 B2 * | 2/2007 | Low | H02G 3/263 24/455 |

(Continued)

FOREIGN PATENT DOCUMENTS

| | | |
|---|---|---|
| EP | 1596483 | 11/2005 |
| WO | 2013050064 | 4/2013 |

*Primary Examiner* — Nkeisha Smith
(74) *Attorney, Agent, or Firm* — Themis Law

(57) ABSTRACT

A device for fastening of cables includes two saddles to be joined onto a cable and provided with seats for housing the cable, the seats having a plurality of tongues that elastically deform when the saddles are closed around the cable, each of the seats having a rigid frame to which the plurality of elastically deformable tongues is secured and sides directed longitudinally and sides having a curvilinear profile following the semi-circular cross-section of the cable. A row of tongues is fastened, at one end, to the side of the frame, and the free opposed end is raised, in the rest position, towards the interior of the seat for housing the cable. A row of tongues is further provided that is fastened, at their end, to the side of the frame, and the free opposed end is raised, in the rest position, towards the interior of the seat.

6 Claims, 7 Drawing Sheets

(56) References Cited

U.S. PATENT DOCUMENTS

| | | | |
|---|---|---|---|
| 8,157,222 B1 * | 4/2012 | Shirey | H02G 3/32 |
| | | | 248/68.1 |
| 9,080,698 B2 * | 7/2015 | Fukumoto | F16L 3/2235 |
| 2007/0128939 A1 * | 6/2007 | Low | H02G 3/30 |
| | | | 439/607.41 |
| 2010/0148015 A1 * | 6/2010 | Matsuno | F16L 3/1075 |
| | | | 248/65 |
| 2014/0091182 A1 * | 4/2014 | Fukumoto | F16L 3/2235 |
| | | | 248/68.1 |
| 2017/0114928 A1 * | 4/2017 | Crounse | H02G 3/32 |

\* cited by examiner

DEVICE FOR THE FASTENING OF CABLES, TUBULAR BODIES AND OTHER ELONGATED BODIES IN GENERAL HAVING A DIFFERENTIATED DIAMETER

The present invention relates to an improved device for the fastening of cables, tubular bodies and other elongated bodies in general, having a differentiated diameter.

The field of the invention relates to devices used for fastening elongated bodies in general, such as cables, tubular bodies and the like, on a support, for example on pylons used for supporting telecommunication antennas.

In this field, it is important that the supporting device exert an effective supporting action on the cable, preventing it from slipping or moving out of its seat, due to its own weight or the action of atmospheric agents.

In this type of application, there is also the requirement of making the fastening device as universal as possible with respect to the different construction diameters of the cables, from the smallest, such as, for example, optical fiber cables, to those having a larger diameter, such as coaxial cables.

For this purpose, fastening devices are known, consisting of two saddles made of rigid plastic material, reciprocally coupled and suitable for being tightened around the cable.

In order to allow the dimensions of these saddles to be compatible with cables having different diameters, thus enabling them to be effectively fixed and withheld on the device, protrusions having suitable dimensions are known to be provided in the calibrated seat that receives the cable inside each saddle.

The main drawback linked to these known embodiments lies in the fact that whereas the above protrusions, on the one hand, are effective for withholding cables having a smaller diameter, on the other, they damage the outer surface of cables having a larger diameter.

The same protrusions also represent an obstacle for the use of known devices on cables having large differences in diameter, as the height of these inner protrusions cannot exceed an upper limit over which damage to the cables with a larger diameter would no longer be acceptable.

In order to overcome this drawback, the insertion of sheaths made of an elastic material is known, which are suitable for protecting the surface of the cable resting inside the relative seat in the saddles of the device. This known solution, however, has the disadvantage of increasing the cost of the fastening device, due to the increased number of components and quantity of material used.

EP 0 647 997 A1 relates to a device for the fastening of cables, in which elastic tabs are secured to corresponding half cheeks mounted to transversal sides of the shells with respect to the longitudinal axis of the cable.

US 2007/120635 A1 discloses a noise filter in which a cable is fastened by means of holding portions provided extending from the bottom wall portions of corresponding case portions.

The main objective of the present invention is to provide an improved device for the fastening of cables, tubular bodies and other elongated bodies in general, having a differentiated diameter, said device, unlike known devices of the known type, being compatible with cables having even very different diameters and without the necessity of resorting to the use of sheaths to avoid damage to their outer surface.

These and other objectives are achieved with the device of claim 1. Preferred embodiments of the device of the invention are specified in the remaining claims.

With respect to devices of the known art, the device according to the invention offers the advantage of allowing cables having very different diameters to be effectively fastened, also without the necessity of resorting to the use of traditional sheaths and without damaging the surface. In this way, the device of the invention is made compatible with cables having different diameters, without having to bear extra costs due to the use of known sheaths.

The device of the invention also offers the advantage of allowing the force with which it holds the cable, to be calibrated, thanks to the flexible behaviour of the tongues with which it is equipped. In particular, the above-mentioned tongues, thanks to their flexible behaviour, are able to respond to the deformations imposed by engagement with cables having a larger diameter, with a corresponding thrust having a proportional intensity. The device of the invention consequently allows the fastening stress of the cable to be regulated in relation to the diameter and therefore also the weight of the same, thus also ensuring the retention of heavier cables.

These and other objectives, advantages and characteristics are evident from the following description of preferred embodiments of the device of the invention, illustrated for illustrative and non-limiting purposes in the figures of the enclosed drawings.

In these:

FIG. 1 illustrates an example of a fastening device of the type to which the invention relates;

FIGS. 2 and 3 respectively illustrate in a front and upper view, a saddle of a fastening device according to the known art;

FIGS. 4 and 5 respectively illustrate in a front and upper view, an example of a saddle of the device according to the invention;

Figure 1:
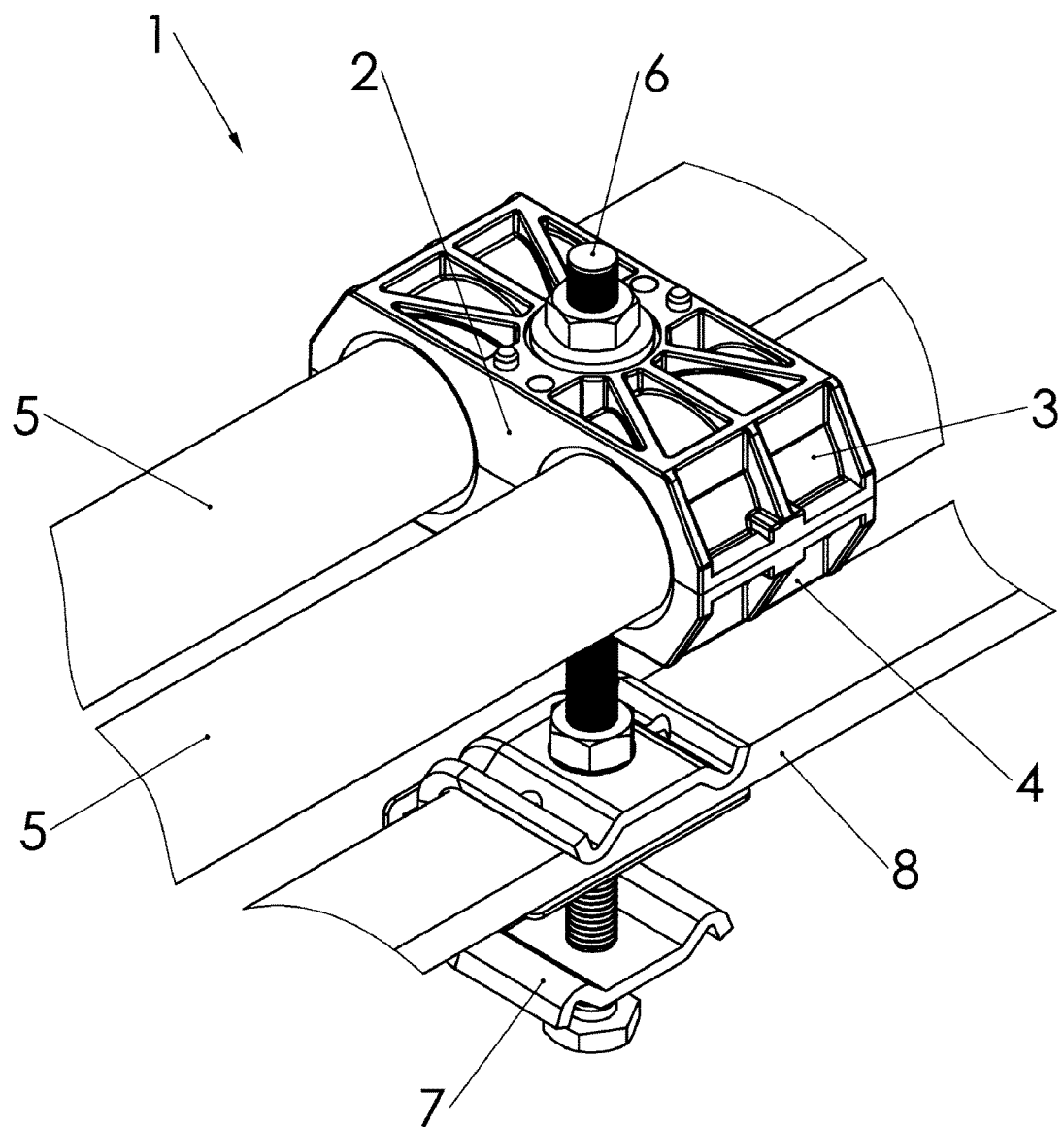

The fastening device illustrated in FIG. 1 is indicated as a whole with reference number 1. In particular, it consists of a body 2 obtained by the coupling of two saddles 3 and 4, held in a closed position on the respective cable 5 by means of a threaded bar 6, in turn provided with a clamp 7 for the anchorage of the same device 1 to the corresponding support 8. Each saddle 3,4 is in turn provided with semicircular seats 9, in which the respective cable 5 is housed.

Figure 2:
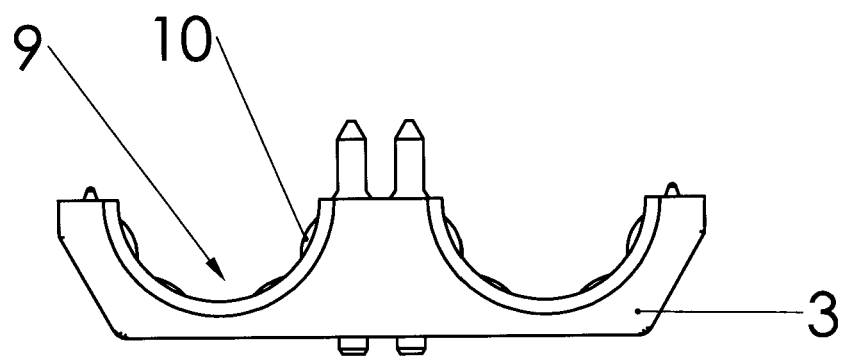
Figure 3:
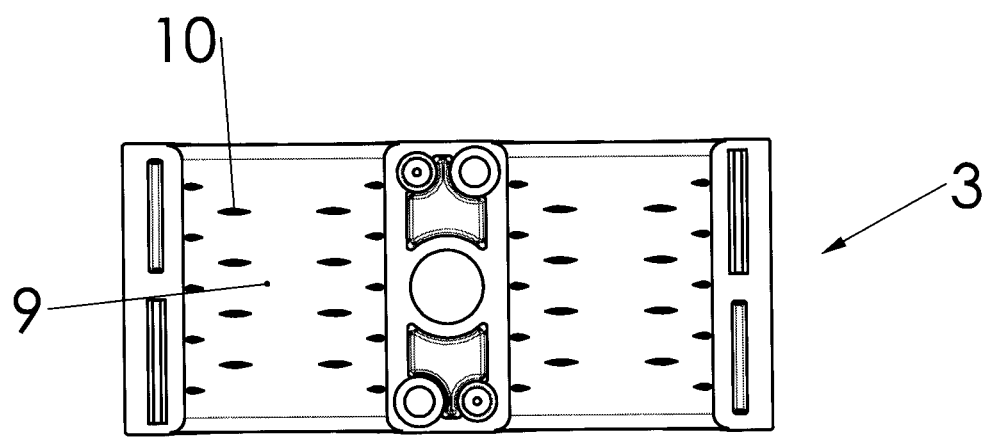
Figure 4:
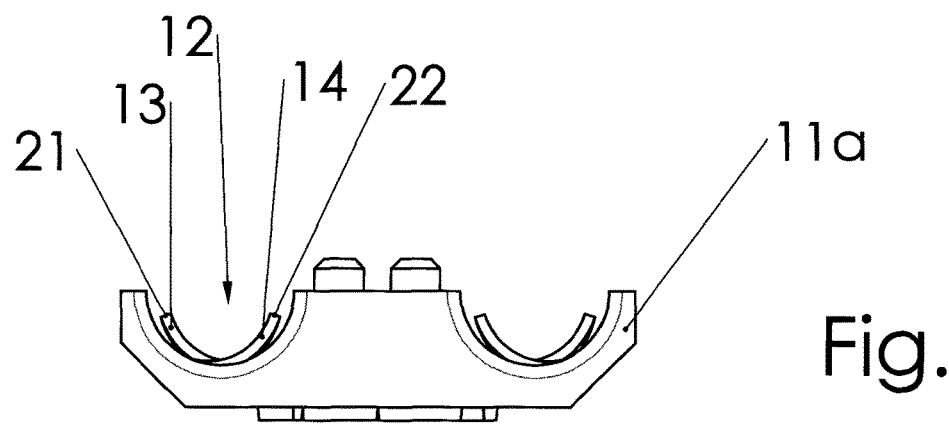
Figure 5:
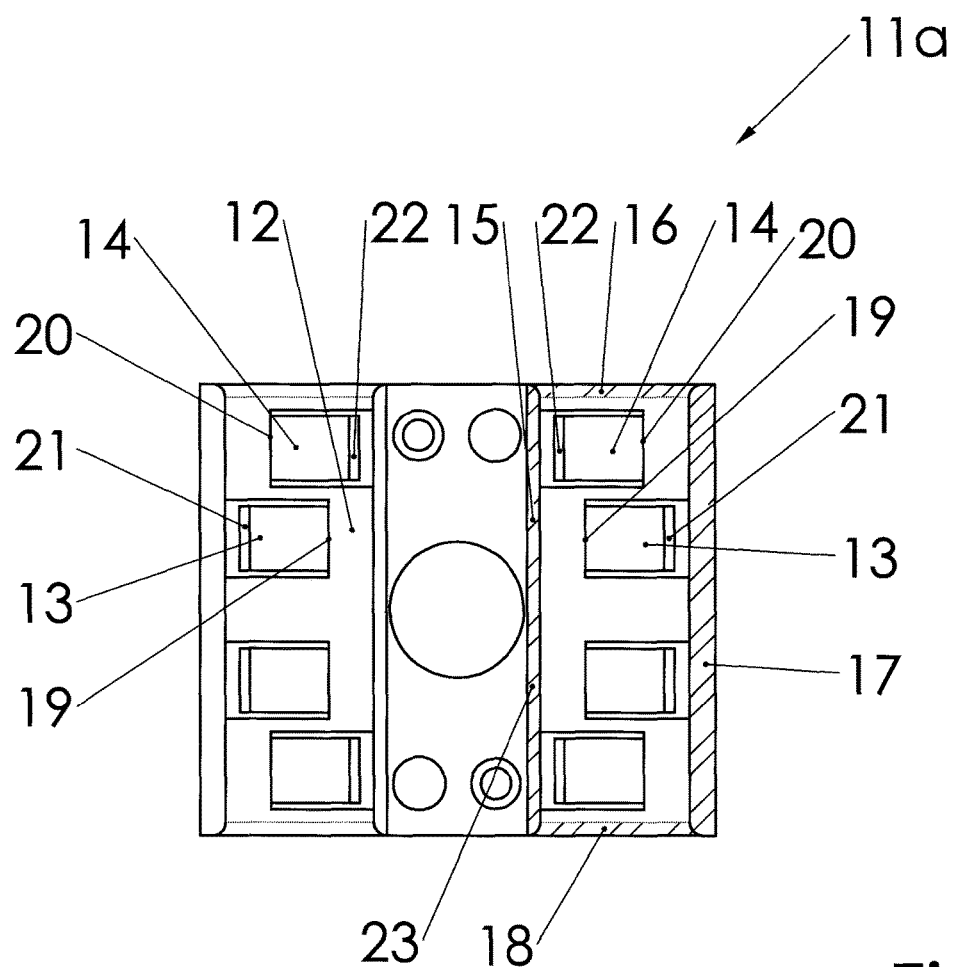

In accordance with the known art illustrated in FIGS. 2 and 3, the internal surface of the above-mentioned semicircular seats 9 has protruding teeth 10, whose function is to compensate, with their height, the differences in diameter of the cables to be fixed onto the device 1. As already explained, however, these teeth must not be excessively high as, in this case, whereas they are effective for holding cables having a smaller diameter, they cause inevitable damage to cables with a larger diameter.

In order to overcome this drawback, the device according to the invention provides seats 11a and 11b, whose housing seat 12 of the cable 5 is composed of a rigid frame 23 to which a plurality of elastically deformable tongues 13,14 is secured.

Figure 6:
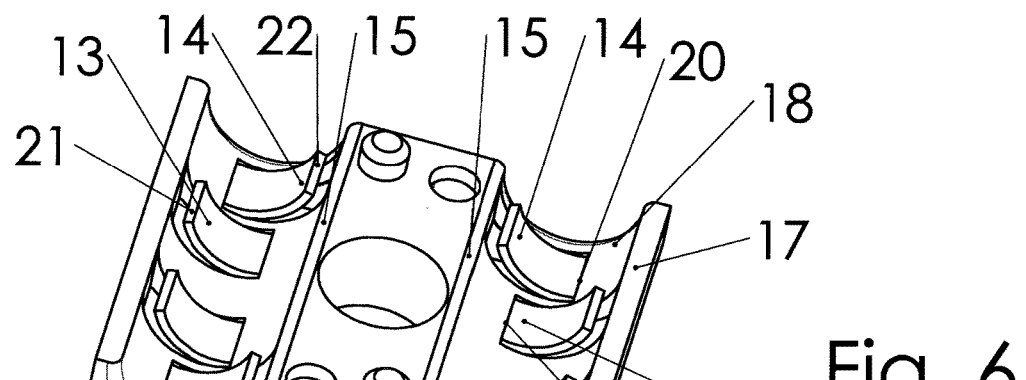
FIG. 6 illustrates a perspective view, of the saddle of FIGS. 4 and 5.

In particular, and as is better represented in FIG. 6, the frame 23 of each seat 11a, 11b has sides 15 and 17 which are directed towards the longitudinal axis of the cable to be withheld, and sides 16 and 18 having a curvilinear profile which follows the circular transversal semi-section of the cable. A row of tongues 13 is fastened on the side 15 of said frame 23, in correspondence with their end 19, the free end 21 of the same tongues being raised, in rest position, towards the interior of the housing seat 12 of the cable 5. A row of tongues 14, on the other hand, is fastened on the opposite side 17 of the same frame 23, in correspondence with their end 20, whose free end 22 is also raised, when in rest position, towards the interior of the housing seat 12 of the cable 5. The two rows of tongues 13 and 14 also have a substantially comb-like distribution, with the tongues 13 positioned within the spaces separating the tongues 14.

Figure 7:
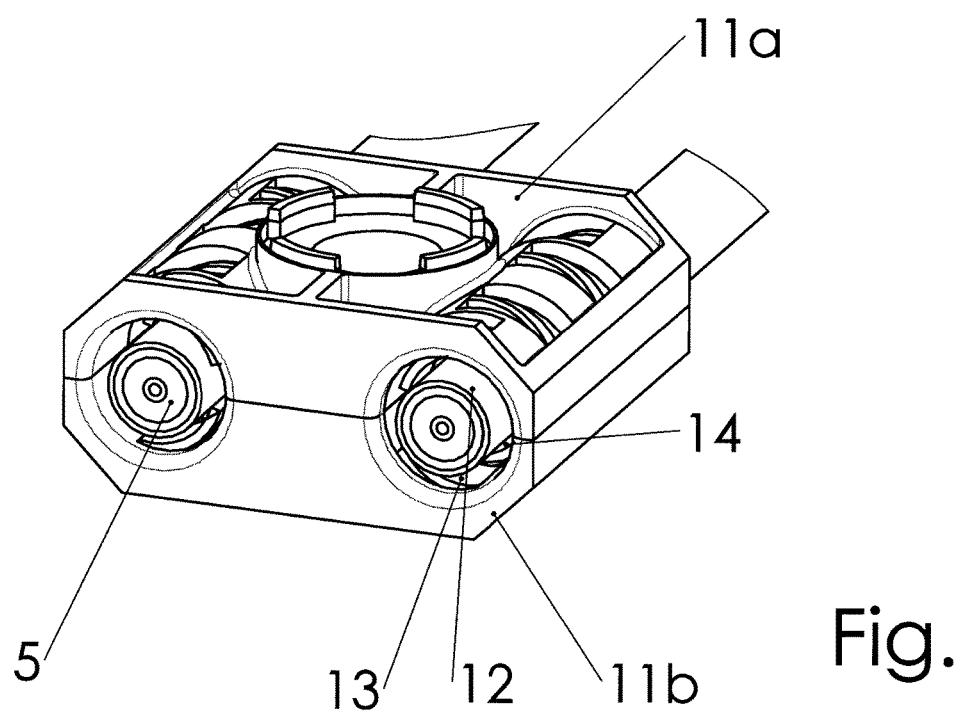
FIGS. 7 and 9 illustrate in a perspective view, the fastening mode of cables having a different diameter on the device of the invention.
Figure 8:
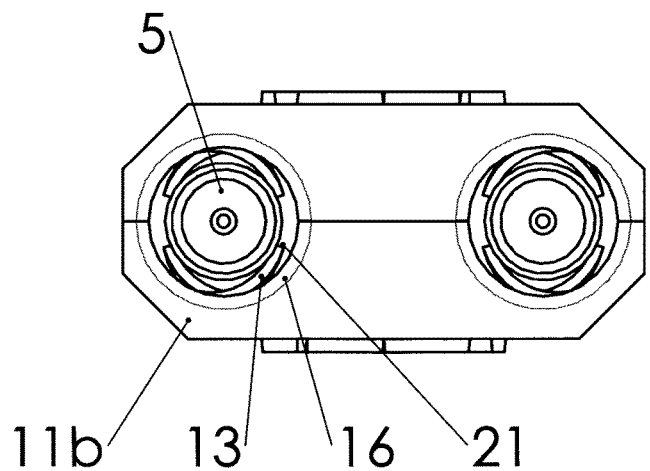
FIGS. 8 and 10 illustrate in a front view, the deformation of the tongues imposed by their engagement with cables having a smaller and larger diameter respectively.
Figure 9:
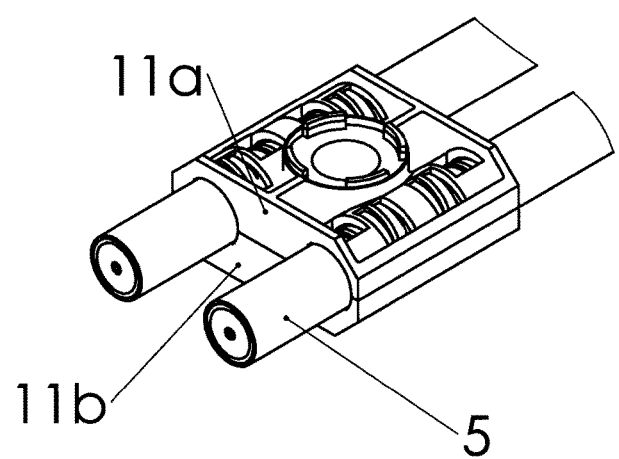
Figure 10:
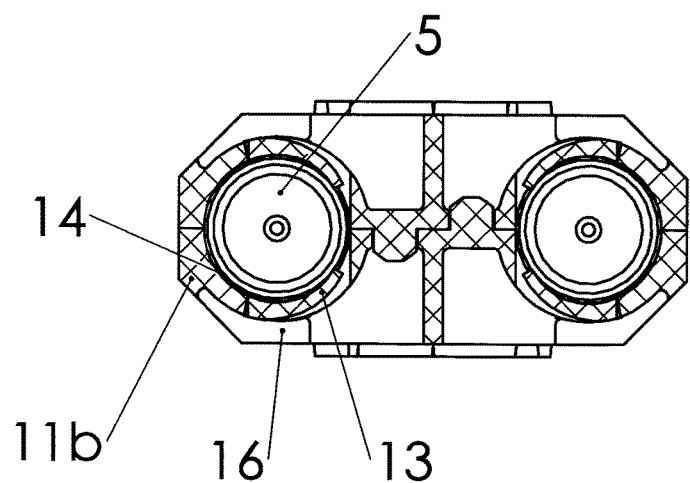

Thanks to the invention, the fastening device is compatible with cables having smaller diameters, as illustrated in FIGS. 7 and 8, in which the tongues 13 and 14 are only partially bent, and also with cables 5 having a larger diameter, as illustrated in FIGS. 9 and 10, in which the tongues 13 and 14 are fully bent, i.e. so as to bring them to the bottom of the housing seat 12 of the cable 5, in turn defined by the sides 16,18 of the frame 23.

Figure 11:
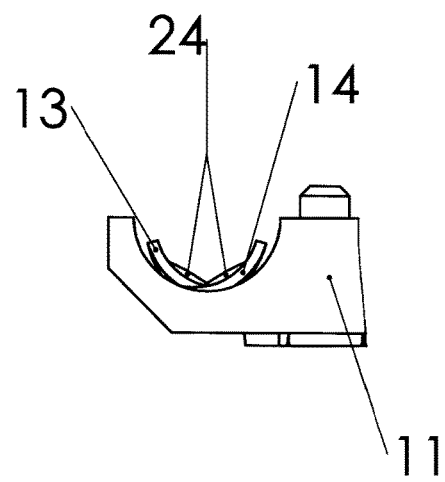
FIGS. 11 and 12 illustrate respective variants of the device of FIG. 4.

In the variant illustrated in FIG. 11, the tongues 13 and 14 are provided with protruding notches 24, suitable for favouring the grip on the cable to be fastened, without however damaging the outer surface, thanks to the flexibility of said tongues.

Figure 12:
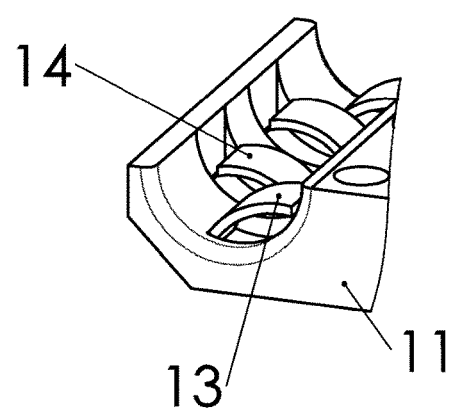

In the variant illustrated in FIG. 12, the conformation of the tongues 13 and 14 is no longer concave, such as that represented in the previous figures, but convex, i.e. facing the cable 5.

For comparative purposes, in the following table, a fastening device according to the known art, as illustrated in the previous FIGS. 2 and 3, is compared with the device of the invention.

| Diameter of housing seat of the cable | Range of cable diameters allowed with the device of the known art | Range of cable diameters allowed with the device of the invention |
|---|---|---|
| 7 | 6-7 | 4-7 |
| 14 | 13-14 | 10-14 |
| 28 | 26-28 | 22-28 |

It can thus be observed that, with the same diameter of the cable housing, the device of the invention is compatible with cables having very different diameters, which fall within a greater range than that allowed by analogous devices of the known art.

The device described above and illustrated in the enclosed drawings can obviously undergo further modifications, to achieve variants which, even if not described and represented in the figures, should be considered as being included within the scope of the following claims. The number of seats 12 present on the saddles 11a and 11b, for example, can be different from that illustrated in the figures, so as to fasten only one cable or more than two cables 5.

The invention claimed is:

1. A device adapted to fasten cables, tubular bodies and elongated bodies in general, comprising:
   a first and a second saddle adapted to be joined together to define a cavity configured to receive a cable therein, said first saddle being provided with a first seat and said second saddle being provided with a second seat, said first seat and said second seat being configured to house said cable, said first seat having a first plurality of tongues and said second seat having a second plurality of tongues, said first plurality of tongues and said second plurality of tongues being each adapted to elastically deform when said first saddle is closed against said second saddle, so that said device is adapted for receiving cables having different diameters,
   said first seat having a first rigid frame and said second seat having a second rigid frame, said first plurality of tongues being secured to said first rigid frame and said second plurality of tongues being secured to said second frame, said first rigid frame and said second rigid frame each having opposing longitudinal sides directed according to a longitudinal axis of said first rigid frame and said second rigid frame and each further having opposing lateral sides transverse to said longitudinal sides and having a curvilinear profile,
   wherein said first plurality of tongues comprises a first row of tongues having ends fastened to a first longitudinal side of said first frame and opposing ends that are raised, in a rest position, towards an interior of said first seat, and a second row of tongues having ends fastened to a second longitudinal side of said first rigid frame and opposing ends that are raised, in the rest position, towards the interior of said first seat,
   wherein said first row of tongues and said second row of tongues have a first comb disposition, in which tongues of the first row are positioned within spaces separating tongues of the second row,
   wherein said second plurality of tongues comprises a third row of tongues having ends fastened to a first longitudinal side of said second frame and opposing ends that are raised, in the rest position, towards an interior of said second seat, and a fourth row of tongues having ends fastened to a second longitudinal side of said second rigid frame and opposing ends that are raised, in the rest position, towards the interior of said second seat, and
   wherein said third row of tongues and said fourth row of tongues have a second comb disposition, in which tongues of the third row are positioned within spaces separating tongues of the fourth row.

2. The device according to claim 1, wherein the first and the second seat are each configured to receive a cable having a larger diameter than the cavity by having the first and the second plurality of tongues adapted to partially bend with respect to the rest position of the first and the second plurality of tongues.

3. The device according to claim 1, wherein the first and the second seat are each configured to receive a cable having a same diameter as the cavity by having said first plurality of tongues and said second plurality of tongues adapted to fully bend up to a bottom of said first and said second seat.

4. The device according to claim 1, wherein said first and said second plurality of tongues comprise tongues that are arc shaped, a concavity thereof being directed towards the interior of said first seat and said second seat.

5. The device according to claim 1, wherein said first and said second plurality of tongues are provided with protruding notches turned towards the interior of said first seat and said second seat.

6. The device according to claim 1, wherein said first plurality of tongues and said second plurality of tongues comprise tongues that are arc shaped, a convexity thereof being directed towards the interior of said first seat and said second seat.

* * * * *